[ # United States Patent Office ]

3,110,129
Patented Nov. 12, 1963

3,110,129
METHOD OF IMPROVING THE SOIL
Heinz Baumann, Zuckerfabrikstrasse 2A,
Frankenthal, Pfalz, Germany
No Drawing. Filed Nov. 23, 1960, Ser. No. 71,359
Claims priority, application Germany Nov. 27, 1959
3 Claims. (Cl. 47—58)

The present invention relates to a method of improving the soil for promoting the growth of plants.

It has for this purpose already been proposed to mix substances of various kinds with the natural soil, including synthetic resin foam in a finely divided condition, for example, in the form of small grains or a powder. Apart from the fact that the mixing of materials and especially of fine foam plastics into the soil is rather difficult and requires considerable time and effort, the results which were attained with the known soil improving agents or the manner in which they were applied were not sufficiently satisfactory and especially not sufficiently long-lasting.

It is an object of the present invention to overcome these disadvantages and to improve the soil for promoting vegetation and the growth of plants by inserting synthetic or plastic foam into the soil in larger pieces or in the form of fresh foam after the soil has, if necessary, been loosened.

If the plastic foam is applied in the form of larger pieces, it has a greater bearing capacity and is not as easily compressed as when applied in a finely divided or ground condition. If, on the other hand, the plastic foam is injected into the soil in a freshly formed condition, it will also loosen the soil from the inside by gas pressure and thereby reduce the compressive effect of the soil upon the foam.

By injecting plastic foam into the soil, a stable skeleton of rigid foam is produced in the soil which fills out any cavities which are existing or are formed in the soil so that these cavities will be filled out substantially by a skeleton of foam. The present invention permits a selective treatment of the soil in accordance with the particular requirements for the growth of a certain plant or plants, regardless of whether they are small or large plants, bushes or trees, by producing or leaving a smaller or larger number of cavities in the soil. The soil-improving agent, namely the plastic foam, may according to the invention be easily inserted into the soil to the desired depth. In most cases it suffices that the plastic foam is interspersed with the soil to a depth of 15 to 25 cm. or, if a layer of plastic foam is deposited in the soil, that it is placed at such a depth.

The method according to the invention is especially of importance for extremely sandy soil, desert areas, dunes, and the like, where the necessary prerequisites for a normal vegetation first have to be produced. In such cases, the embedding of larger pieces of plastic foam or foam of a skeletonlike structure in the soil prevents the soil from being carried away by the wind in the form of driftsand, the foam will retain sufficient moisture of any kind within the ground for a long time, and roots of any kind of plants may easily grow through such foam. Thus, the formation of humus will be strongly promoted.

The foam cells which according to the invention are amply deposited in the soil and remain therein produce and promote a thorough and long-lasting fermentation. Favorable water, air, and temperature conditions are then produced in the soil and beneficial bacteria may develop therein. A skeleton or a layer of plastic foam insures that moisture supplied by rain or irrigation will be extensively and uniformly distributed within the soil, and it serves as an underground reservoir of water or moisture which is slowly dissipated into the soil during dry spells. This is also especially useful and beneficial when nutrient salts or other growth-promoting substances are to be supplied to the soil by spraying, watering or irrigating the same.

For injecting the plastic foam into the soil, suitable hollow lances or the like may be used which are connected to the foam-producing or extruding apparatus and are adapted to inject the foam toward all sides into the ground.

A sandy or light soil usually permits the injection of the plastic foam without requiring any additional measures, while a heavy, solid soil should first be loosened before the foam is injected.

The foam may be inserted as a layer underneath a humus layer, in which case it has the primary purpose to store up a layer of moisture within the ground. If the soil is sterile or unfertile, such as sand, the plastic foam when applied as a substratum has the purpose of storing up water and to allow a humus layer to form above. If the plastic foam is applied in the ground as an intermediate stratum, it generally prevents fertilizers from being washed out to the lower strata.

The invention further provides that nutrient salts, trace elements, and other growth-promoting substances may be inserted into the soil together with the plastic foam. If the foam is injected into the soil in the form of fresh foam, the growth-promoting substances may be mixed in a dissolved, emulsified, or suspended form with a solution which may be used for producing the plastic foam. In such a case, the added substances will be partly deposited in the cells of the foam from which they will later be gradually diffused into the soil through the cell walls or pass from the open cells into the soil.

The plastic foam is preferably produced by means of air or oxygen. In this manner it is possible to insert the air or oxygen in a well-distributed condition into the soil and to store it therein for gradual consumption by the respective plants. The suction produced by the fine foot fibers of plants apparently causes or promotes a diffusion of the contents of the individual foam cells or even opens the foam vesicles at their point of contact with them so that, as time progresses, the foam itself will be gradually consumed by the soil. The foam which has thus been consumed or absorbed by the soil may then be easily and very simply replaced, especially by injection.

The plastic foam according to the invention is preferably produced of a base of urea formaldehyde or melamin formaldehyde or combinations thereof. Such a plastic foam should preferably be contained at least partly within the fresh foam or also within the large pieces of foam.

The foam may be produced, for example, from a sulphonate solution together with air or oxygen and may then be mixed with a synthetic resin as a solidifying agent for the foam. Thus, for example, a fatty alcohol sulphonate of sodium or sodium lauryl sulphonate or a similar suitable ammonium compound may be used as a foam-producing agent. For the formation of the final resin, a suitable reaction accelerator is preferably added to the watery solution of the foaming agent and, after the latter has been converted into foam by means of air or oxygen, a solution of a suitable resin pre-condensate, for example, of a urea formaldehyde pre-condensate is mixed into the foam. The reaction accelerator to be used may consist, for example, of phosphoric acid or oxalic acid which may be added to the solution of the foaming agent at such an amount that the foam emerging from the injection or spraying apparatus will have self-supporting properties.

For injecting the fresh plastic foam into the ground, conventional portable or mobile injection or spraying apparatus may be used which are provided with exchangeable compressed-air or oxygen containers as well as exchangeable or refillable containers for the solution of the foaming agent and the resin pre-condensate solution. The injection or spraying of the foam may then be carried out by means of the compressed gas which is used for producing the foam.

The foam, after being thus produced, may also be mixed with a different kind of synthetic resin, for example, with a phenolic plastic or polyester resin. Urea formaldehyde resin foam may then serve as a carrier substance for plastics which by themselves are not foamable or which can be whipped up into foam only by means of propellants. The presence of a different kind of resin within the foam has the advantage that the decomposition of the basic foam in the soil will be retarded so that a cellular system will remain in the soil at least to some extent for a long time. Depending upon the selected type of the additional plastic, the supporting or elastic properties of the plastic foam may be increased. If a mixture of a plastic with a propellant is added to the plastic foam, it is possible to loosen up the foam considerably.

Additional substances of this kind as well as of a different kind are preferably mixed into the freshly prepared plastic foam which has been produced in the manner as previously stated. It is, however, also possible to saturate fully cured lump foam, for example, foam plates, with suitable solutions and then to subject such a product to a drying or heating treatment, if necessary.

Solid additions such as cultivated soil or other growth-promoting substances are preferably mixed with the freshly formed plastic foam while the same is still moldable. If the foam is produced by means of a spraying apparatus, this may be done in such a manner that the respective solid substances are mixed into the fresh foam when the latter emerges from the spraying apparatus.

If the foam is applied in the form of lump foam, for example, in the form of foam plates, the solid growth-promoting substances may be deposited therein in groups or nests in specially produced cavities. This is advisable in some cases when such substances are to be supplied to the soil in larger quantities and gradually within a longer period of time.

The solid substances which may thus be mixed with or deposited in the foam may consist not only of humus, fertilizers, peat, or other soil-improving materials, but in place thereof or in addition thereto it is also possible to mix or deposit seeds in the foam.

Furthermore, the plastic foam which is to be embedded in the soil may also be mixed with young plants. Thus, for example, it is possible to deposit seeds in the foam during the course of production of foam plates and to allow them to germinate and to develop into young plants within the foam plates, and then to deposit these plates in the soil. By thus being able to embed either the seeds or even young plants with the plastic foam in the soil, it is possible to anchor the foam as well as the plants very quickly within the soil and thus to bind the soil and to produce the requisite conditions for the gradual improvement of the soil and the growth of the plants. This is especially of importance in desert areas and in shifting dunes.

The application of foam according to the invention either in the form of larger pieces or by being injected into the soil in the form of fresh foam is very useful also for protective hills which are intended for shielding soil-improved fields. Since moisture will be retained in such hills and seeds will be easily able to sprout, and plants can grow with firm roots and will thereby solidify the soil, such protective hills will resist storms and prevent the soil from being blown away in the form of sand or dust.

When building such protective hills or wind-breakers it is advisable to include decayable materials, for example, grass, straw, leaves, and the like. They may be tied together to form plaits, mats or the like. In combination with such decayable materials, it is thus possible to build up such protective hills very quickly and without great effort when applying lump foam or foam plates or by spraying or injecting fresh foam. When no longer necessary, such hills may be leveled by being plowed under, while other protective hills of a similar kind may be quickly built up at other places so that desolate areas may be quickly changed into arable fields.

An embedding of fresh foam in the soil by injecting it therein has the advantage that the compressed gas which is then applied, for example, air or oxygen, also produces a loosening of the soil and that the cells within the foam will not be destroyed by any outside pressure.

Although my invention has been illustrated and described with reference to the preferred embodiment thereof, I wish to have it understood that it is in no way limited to the details of such embodiment but is capable of numerous modifications within the scope of the appended claims.

Having thus fully disclosed my invention, what I claim is:

1. A method of improving soil, which comprises depositing a layer of foamed plastic below the surface of said soil, said foam constituting in said soil a stratum of cellular structure, the cells of said structure being substantially filled with an oxygen-bearing gas under pressure.

2. A method improving soil, which comprises introducing a foamy mixture of a gas under pressure with a liquid containing a hardenable plastic-forming material from the surface of said soil to an area of said soil inwardly spaced from said surface, said foam constituting in said soil a stratum of cellular structure, said introduction being carried out by laterally injecting said mixture into said soil from said area under the pressure of said gas.

3. A method as set forth in claim 2, wherein said plastic-forming material includes a precondensate of a plastic selected from the group consisting of urea formaldehyde, melamine formaldehyde, and mixtures thereof, and a curing agent for said precondensates, and said gas consists at least partly of oxygen.

References Cited in the file of this patent

UNITED STATES PATENTS

| Re. 24,820 | O'Brien | May 3, 1960 |
| 407,822 | Gross | July 30, 1889 |
| 1,864,672 | Rose | June 28, 1932 |
| 2,023,270 | Fischer | Dec. 3, 1935 |
| 2,030,267 | Pratt | Feb. 11, 1936 |
| 2,158,952 | Timberlake | May 16, 1939 |
| 2,309,702 | Kirschenbaum | Feb. 2, 1943 |
| 2,351,256 | Fischer | June 13, 1944 |
| 2,785,969 | Clawson | Mar. 19, 1957 |
| 2,945,322 | Gaeth | July 19, 1960 |
| 2,965,584 | Elkin | Dec. 20, 1960 |
| 2,988,441 | Pruitt | June 13, 1961 |
| 3,019,557 | Katchalsky | Feb. 6, 1962 |
| 3,020,676 | McGillivray | Feb. 13, 1962 |

FOREIGN PATENTS

| 254,643 | Germany | Nov. 14, 1912 |
| 839,944 | Germany | May 26, 1952 |
| 920,487 | Germany | Nov. 22, 1954 |